US009647939B2

(12) United States Patent
Kumagai et al.

(10) Patent No.: US 9,647,939 B2
(45) Date of Patent: May 9, 2017

(54) COMMUNICATION DEVICE AND COMMUNICATION SYSTEM

(71) Applicant: FURUKAWA ELECTRIC CO., LTD., Tokyo (JP)

(72) Inventors: Atsushi Kumagai, Tokyo (JP); Kunio Odaka, Tokyo (JP); Masayuki Miura, Tokyo (JP); Kazutaka Shimoosako, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/152,491

(22) Filed: Jan. 10, 2014

(65) Prior Publication Data

US 2014/0126576 A1 May 8, 2014

Related U.S. Application Data

(63) Continuation of application No. PCT/JP2012/067744, filed on Jul. 11, 2012.

(30) Foreign Application Priority Data

Jul. 12, 2011 (JP) ................................. 2011-153506

(51) Int. Cl.
*H04L 12/741* (2013.01)
*H04W 40/02* (2009.01)
(Continued)

(52) U.S. Cl.
CPC ............ *H04L 45/745* (2013.01); *H04L 43/10* (2013.01); *H04L 45/74* (2013.01); *H04L 61/103* (2013.01);
(Continued)

(58) Field of Classification Search
CPC ...................................................... H04L 12/741
(Continued)

(56) References Cited

U.S. PATENT DOCUMENTS 6,405,270 B1 * 6/2002 Chen ................. H04L 12/40078
370/256
6,795,403 B1 * 9/2004 Gundavelli ............. H04L 41/12
370/256
(Continued)

FOREIGN PATENT DOCUMENTS

| CN | 101552732 A | 10/2009 |
| JP | 2004-304371 A | 10/2004 |

(Continued)

OTHER PUBLICATIONS

Office Action issued Apr. 4, 2014 in Japanese Patent Application No. 2013-523967 with English language translation.
(Continued)

Primary Examiner — Rasheed Gidado
(74) Attorney, Agent, or Firm — Oblon, McClelland, Maier & Neustadt, L.L.P.

(57) ABSTRACT

Provided are a communication device and a communication system in which multi-hop communication is possible and management of communication routes is easy.
In a distribution-system communication device 100, a port management means 132 is provided in a communication control unit 130, and each of ports provided in a port section 110 can be managed with the port management means 132 by IP addresses of adjacent stations connected to each of the ports. In a port management means 132 of a master station, correspondence information between port numbers of the port section 110 of each of the slave stations and the IP addresses of adjacent stations of a connection destination is input from the port management means 132 of each of the
(Continued)

slave stations, and connection states between the ports of each of the slave stations can be managed based on the correspondence information.

10 Claims, 12 Drawing Sheets

(51) Int. Cl.
 *H04L 12/26* (2006.01)
 *H04L 29/12* (2006.01)
(52) U.S. Cl.
 CPC ......... *H04L 61/6009* (2013.01); *H04W 40/02* (2013.01); *Y04S 40/168* (2013.01)
(58) Field of Classification Search
 USPC .................................................. 370/392, 401
 See application file for complete search history.

(56) References Cited

U.S. PATENT DOCUMENTS

| | | | |
|---|---|---|---|
| 7,782,854 B2* | 8/2010 | Sakata et al. ................. | 370/392 |
| 7,860,615 B2 | 12/2010 | Nelson et al. | |
| 8,351,440 B2* | 1/2013 | Sawada et al. .............. | 370/401 |
| 8,483,051 B2* | 7/2013 | Akahane et al. ............ | 370/222 |
| 8,867,341 B2* | 10/2014 | Shao et al. ................... | 370/229 |
| 2004/0213272 A1* | 10/2004 | Nishi et al. .................. | 370/401 |
| 2005/0007951 A1* | 1/2005 | Lapuh .................... H04L 45/00 | |
| | | | 370/225 |
| 2005/0041590 A1* | 2/2005 | Olakangil .............. H04L 45/00 | |
| | | | 370/238 |
| 2005/0251296 A1 | 11/2005 | Nelson et al. | |
| 2007/0005193 A1 | 1/2007 | Nelson et al. | |
| 2007/0067823 A1* | 3/2007 | Shim ..................... H04L 63/101 | |
| | | | 726/2 |
| 2007/0242607 A1* | 10/2007 | Sadler et al. ................. | 370/238 |
| 2008/0008192 A1* | 1/2008 | Matoba ........................ | 370/397 |
| 2008/0250496 A1* | 10/2008 | Namihira ....................... | 726/22 |
| 2010/0241744 A1* | 9/2010 | Fujiwara ...................... | 709/224 |
| 2010/0303078 A1* | 12/2010 | Karir ............................ | 370/392 |
| 2011/0018704 A1* | 1/2011 | Burrows ...................... | 340/538 |
| 2011/0019679 A1 | 1/2011 | Akahane et al. | |
| 2011/0066296 A1 | 3/2011 | Nelson et al. | |
| 2011/0149978 A1* | 6/2011 | Moser et al. ................. | 370/400 |
| 2012/0051252 A1 | 3/2012 | Iwao et al. | |
| 2013/0003530 A1* | 1/2013 | Davari ................. H04L 12/437 | |
| | | | 370/225 |

FOREIGN PATENT DOCUMENTS

| | | |
|---|---|---|
| JP | 2005-210818 A | 8/2005 |
| JP | 4157554 B2 | 7/2008 |
| JP | 2011-29829 A | 2/2011 |
| WO | 2010/131288 A1 | 11/2010 |

OTHER PUBLICATIONS

International Search Report mailed Aug. 14, 2012 in PCT/JP2012/067744, filed Jul. 11, 2012.
Extended European Search Report issued Feb. 10, 2015 in Patent Application No. 12811357.8.
Management and Configuration Guide for the ProCurve Switch 2600 Series, Switch 2600-PWR Series, Switch 2800 Series, Switch 4100gI Series, and Switch 6108 (Oct. 2005) 7-1 7 IP Routing Features Contents XP055110204, Oct. 30, 2005, pp. 1-40.
Office Action issued Dec. 16, 2015 in Chinese Patent Application No. 201280032311.5 (with English language translation).
Yong Liu, "Study of mobile Ad HOC network multi-channel MAC protocol", May 2010, pp. 37-45 (with partial English translation).

* cited by examiner

| TARGET STATION | ADJACENT STATION | COMMUNICATION COST |
|---|---|---|
| MASTER STATION 1 | SLAVE STATION 1 | 10 |
| SLAVE STATION 2 | SLAVE STATION 3 | 4 |
| ⋮ | ⋮ | ⋮ |
| SLAVE STATION 5 | SLAVE STATION 5 | 1 |

FIG. 9

| No. | IP | MAC |
|---|---|---|
| 1 | 11.22.33.44 | 11-22-33-44-55-66 |
| 2 | 22.33.44.55 | 22-33-44-55-66-77 |
| ... | | |
| n | 33.44.55.66 | 04-EF-FE-33-44-44 |

FIG. 10

| No. | MAC | PORT |
|---|---|---|
| 1 | 11-22-33-44-55-66 | 411 |
| 2 | 22-33-44-55-66-77 | 412 |
| ... | | |
| n | 04-EF-FE-33-44-44 | 413 |

# COMMUNICATION DEVICE AND COMMUNICATION SYSTEM

TECHNICAL FIELD

The present invention relates to a communication device and a communication system suitably used in monitoring and control of a power distribution system, and more particularly, to a communication device and a communication system that are capable of flexibly achieving a system construction and easily managing a system state.

BACKGROUND ART

In the past, when an accident such as an earth fault or a short circuit occurs in a power distribution system of a power system, a monitoring control system performs a switching control of switches such that an accident section separated by two switches around an accident spot is instantly isolated, and a power is distributed to the other sections. An example of a conventional monitoring control system, which monitors and controls a power distribution system, will be described with reference to FIG. 15. FIG. 15 is a block diagram illustrating a configuration of a conventional monitoring control system installed in a power distribution system.

In FIG. 15, the power distribution system 900 is designed to distribute a power from a transformer 902 provided within a distribution substation 901 by using a distribution line. In order to limit effects as much as possible when an accident such as an earth fault or a short circuit occurs in the distribution line, the power distribution system 900 includes circuit breakers (CBs) 911 and 916 for disconnecting the distribution system from the transformer 902, and a plurality of switches 912 to 915 and 917 to 921 in the middle of the distribution line. Also, the power distribution system 900 includes a monitoring control system 930 for monitoring an occurrence of an accident and appropriately processing this. The monitoring control system 930 includes a master station (center device) 903 and also includes slave stations 932 to 935 and 937 to 941 at the switches 912 to 915 and 917 to 921, respectively. The slave stations 932 to 935 and 937 to 941 are directly connected to the master station 903 via a predetermined communication line, or are connected to the master station 903 through other slave stations.

In the conventional example illustrated in FIG. 15, distribution lines of two systems are connected from the transformer 902 through the CBs 911 and 916, and four switches 912 to 915 and four switches 917 to 920 are disposed therein, respectively. In addition, two distribution systems can be connected together by the switch 921. Also, the slave stations 932 to 935 and 937 to 941, which are respectively provided at the switches 912 to 915 and 917 to 921, are connected to the master station 903 by using a predetermined communication line in the same connection relationship as the switches 912 to 915 and 917 to 921. In the conventional monitoring control system 930, a power line or a metal cable has been used as the communication line. The configuration of the conventional monitoring control system is disclosed in, for example, Patent Literature 1.

In the power distribution system 900 described above, for example, when an earth fault accident occurs, an accident treatment method (hereinafter, referred to as a first accident treatment method) by the conventional monitoring control system 930 will be described below. In FIG. 15, when an earth fault occurs at a spot A, the CB 911 is interrupted and a power distribution to a more downstream side than the CB 911 is stopped. As a result, since the switches 912 to 915 receive no power, the switches 912 to 915 are non-voltage-opened.

When the master station 903 detects that the CB 911 has been interrupted and the switches 912 to 915 have been non-voltage-opened, the master station 903 first confirms that no earth fault current is generated by performing a closing control on the CB 911 so as to detect an accident section and resume a power distribution to sections other the accident section. After that, the master station 903 instructs the slave station 932 to perform a closing control on the switch 912. The slave station 932 performs the closing control on the switch 912 according to the instruction from the master station 903. However, since the switch 912 is not the accident section, the earth fault current is not generated and the CB 911 is not interrupted.

When the master station 903 confirms that the CB 911 is not interrupted even when the closing control is performed on the switch 912, the master station 903 also instructs the slave station 933 to perform a closing control on the switch 913. The slave station 933 performs the closing control on the switch 913 according to the instruction from the master station 903. At this time, since the earth fault current flows again through the accident spot A, the CB 911 is interrupted again. As a result, the switches 912 to 915 are non-voltage-opened again. Therefore, the master station 903 determines that the accident section is located between the switches 913 and 914. Then, the switches 913 and 914 of the accident section are locked.

After the closing control of the CB 911, the master station 903 instructs the slave station 932 to perform a closing control on the switch 912 so as to resume the power distribution to a more upstream side than the locked switch 913. When the slave station 932 performs the closing control on the switch 912 according to the instruction, the power distribution to the more upstream than the switch 913 is resumed. Also, after the locking of the switch 914, the master station 903 instructs the slave station 941 to perform the closing control on the switch 921. When the slave station 941 performs the closing control on the switch 921 according to the instruction, the power distribution is resumed in a section from the switch 921 to the switch 914. Therefore, the power distribution is resumed in all sections other than the accident section including the spot A.

The first accident treatment method by the conventional monitoring control system 930 has a problem in that in addition to the earth fault current in the occurrence of the accident, the earth fault current is generated again for the detection of the accident section, and power facilities are overloaded by the two earth fault currents. Also, since all the switches of the distribution system including the accident spot are temporarily opened, there is a problem that a power failure temporarily affects sections other than the accident section. Also, since the plurality of switches is opened by one accident, there is a problem that it takes time to restore it.

In this regard, there is known another accident treatment method (hereinafter, referred to as a second accident treatment method) that is configured to prevent an occurrence of a power failure except for accident occurrence. The second accident treatment method will be described below with reference to the power distribution system 900 and the monitoring control system 930 illustrated in FIG. 15. In the second accident treatment method, current waveforms or phases from the respective slave stations at the time of the accident are integrated into the master station 903. Therefore, the accident section is determined without causing the power failure again, and the corresponding section is isolated from the distribution system.

When the master station 903 determines that the accident occurred between the slave stations 933 and 934, the master station 903 instructs only the slave stations 933 and 934 to open the switches 913 and 914, respectively. When the slave stations 933 and 934 open the switches 913 and 914 according to the instruction, respectively, only the accident section is isolated from the distribution system. After the switch 914 is opened, the master station 903 instructs the slave station 941 to perform the closing control on the switch 921. When the slave station 941 closes the switch 921 according to the instruction, the power distribution is resumed in a section from the switch 921 to the switch 914. Therefore, the power distribution is resumed in all sections other than the accident section including the spot A.

In the second accident treatment method, the accident condition is continued until the switches 913 and 914 are opened and the accident section is isolated, and thus, the power facilities are overloaded. Therefore, the loads of the power facilities can be reduced by performing the above processing at a high speed (for example, several ten ms to several hundred ms).

However, in order to perform the second accident treatment method at a high speed, the master station needs to perform, at a high speed, the processing of inputting information about a direction of the accident section from each slave station, determining the accident section based on this, instructing two slave stations corresponding to the accident section to open the switches thereof according to the determination result, and instructing the closing control of the switches connected to other distribution system so as to resume the power distribution to the more downstream side than the accident section. As such, in the second accident treatment method, the load of the master station is increased and traffic is also significantly increased. Therefore, there is a need for a communication device and a communication system capable of coping with an increase in traffic.

A necessary control in the conventional monitoring control system 930 is only to open and close each switch, and is a low capacity that can be sufficiently covered by the communication line such as the metal line or the power line used in the conventional monitoring control system.

On the other hand, a lot of distributed power supplies, such as solar cells, wind power generation facilities, and fuel cells, have recently been connected to the distribution line. These distributed power supply facilities may cause a reverse power flow and cause a variation in the voltage of the distribution line. It is expected that the introduction of the distributed power supply will be more accelerated in the future, and it is essential to introduce a system that detects a voltage variation.

As the system capable of detecting the voltage variation, those using a switch with a sensor are beginning to be used. In the corresponding system, a voltage sensor is embedded into a switch, so that voltage data can be periodically acquired and can be transmitted to a substation.

As the introduction of the distributed power supply is in progress, capacity expansion is required because it is necessary to acquire high-frequency, high-accuracy voltage data and capacity shortage occurs in a communication network using the metal line or the power line used in the conventional distribution line communication. Also, such voltage data is data related to a stable supply of power, and high reliability is required even in a communication network that deals with transmission.

Therefore, in order to enable a stable high-capacity communication, it is preferable that the communication devices provided in the master station and the slave stations, and the communication system constructed by connecting them are made in an optical manner. Also, in the monitoring control system used in the distribution system, since it is necessary to arrange a plurality of slave stations in a distributed manner, it is preferable to reduce the load of the communication device installed in each slave station and easily perform the construction of the communication system or the addition of the slave stations. In a network of a TCP/IP standard, it is possible to add a routing function that can construct a communication network more flexibly than in the past. However, there has been a problem that the load of the routing function is heavy and the device increases in size. Also, in order to increase reliability, configurations capable of route redundancy are preferable. One of such configurations is a multi-hop communication system that uses TCP/IP and implements an L3 routing protocol in each communication device.

As one of multi-hop communication technologies, there is known a wireless communication technology of, for example, a ZigBee (registered trademark) standard, which connects a plurality of distributed nodes and performs a signal transmission with a target node via another node (relay processing). An Ad hoc On-demand Distance Vector (AODV), which is a route search algorithm adopted in the network of the ZigBee standard, is one of L3 routing protocols and can reduce the load of the routing processing and can miniaturize the communication device or reduce power consumption. Therefore, by introducing the ZigBee (registered trademark) standard adopting the AODV, which can easily achieve the miniaturization, load reduction, and low power consumption, into an optical communication capable of high-capacity communication, it is expected to realize a distribution-system communication device and a distribution-system communication system which are capable of performing large-capacity communication and reducing arithmetic processing.

Also, in the past, a distribution-line remote monitoring control communication system, to which IP is applied, has been put to practical use. As disclosed in, for example, Patent Literature 2, an IP communication is adopted in a communication network between master and slave stations of a distribution line, and thus, a route is duplexed. According to Patent Literature 2, a plurality of ports can be provided at one node by adopting optical SW-HUB, and high-capacity data communication can be realized at low cost by employing the IP typically used in high-capacity communications such as Internet. In addition to this, a function of maintaining a communication in an emergency is provided by duplexing a route for a distribution-line remote monitoring control communication system requiring high reliability.

Since high reliability is required in the distribution-line monitoring control system using the IP, it is preferable to perform a route redundancy and monitor whether each route is normal. In order to confirm whether a state of an optical path is normal, it is general to perform a management of physical layer information a transceiver has (for example, transmission/reception power). At this time, since it needs to be managed in conjunction with route switching information, it is necessary to recognize to which IP address each transceiver is linked. The communication device can perform matching by using an address correspondence table (ARP table in IPv4, neighbor cache in IPv6) matching IP address with MAC address, and can match ports with MAC addresses with reference to a table of an SW-HUB. Therefore, by matching information of two tables, information of the port and the IP address can be matched.

CITATION LIST

Patent Literature

Patent Literature 1: Japanese Patent No. 4157554
Patent Literature 2: JP 2005-210818 A

SUMMARY OF INVENTION

Technical Problem

In the AODV protocol adopted in ZigBee (registered trademark) or the like, when a portion of a communication route between nodes is cut, a routing means searches another communication route and therefore communication can be continued. The routing means can be performed in each node and can be performed at each node ad hoc. However, in the monitoring control system of the power distribution system, in order to ensure the stability and reliability of the communication system, it is necessary for the master station to manage the state of the communication route connecting the communication devices, that is, which slave stations are connected by the communication route. Therefore, when the communication route is changed in each communication device ad hoc, it may be difficult to manage the communication route between the communication devices in the master station. Also, the communication system managing the state of the communication route connecting the communication devices has the same problems as described above.

Also, in the system in which route redundancy is performed, there exist a route that is typically used in a communication of an upper layer and a route that is not typically used. Generally, when unicast transmission is performed toward the corresponding IP address, address information exchange is performed and items of the address correspondence table are constructed for the first time. Therefore, regarding the route that is not typically used, the address correspondence table is not created, and consequently, the port and the IP address cannot be managed together. Therefore, it is impossible to diagnose a state of a node which the route is switched to. For example, in a system disclosed in Patent Literature 2, it is difficult to maintain communication at the time of network failure unless both of duplexed communication routes are already known routes.

The present invention has been made in an effort to solve these problems and is directed to provide a communication device and a communication system in which multi-hop communication is possible and management of communication routes is easy.

Solution to Problem

A first aspect of a communication device of the present invention is disposed at nodes constituting a network including a predetermined communication line and performs a multi-hop communication. The communication device includes: two or more ports that are connected to the adjacent nodes (hereinafter, referred to as adjacent stations) by the predetermined communication line; a transmission/reception processing unit that is connected to the two or more ports and manages MAC addresses of a signal source and a signal destination; and a communication control unit that is connected to the transmission/reception processing unit and manages IP addresses of the signal source and the signal destination, wherein the signal source and the signal destination are the adjacent stations different from each other, the communication device includes an address correspondence table creating means that creates an address correspondence table by associating the IP address and the MAC address of the adjacent station being the destination, and when the signal is input from the node of a MAC address that is not registered in the address correspondence table, the address correspondence table creating means acquires MAC address and IP address from the signal and adds a combination of the MAC address and the IP address to the address correspondence table.

In another aspect of the communication device of the present invention, the communication device includes a MAC table creating means that creates a MAC table storing the MAC address of the adjacent station connected to each of the ports, the communication control unit includes a routing means that determines a communication route, and the port and the IP address of a connection destination are associated with each other from the MAC address table and the address correspondence table, a port management table associating state information of a communication route connected to the port is created, and port management and routing processing are performed based on information of the port management table.

In another aspect of the communication device of the present invention, the transmission/reception processing unit includes: a MAC table creating means that creates the MAC table storing the MAC address of the adjacent station connected to each of the ports, and an address correspondence table creating means that creates the address correspondence table, and the communication control unit includes a port management means that creates a port connection table associating the port and the IP address of the connection destination by inputting the MAC address table and the address correspondence table from the transmission/reception processing unit, and manages the connection destination of each of the port as the IP address by using the port connection table.

In another aspect of the communication device of the present invention, a transceiver is provided in the port, the transceiver includes a diagnosis means that diagnoses an operation state, and the port management means manages diagnosis information together with the port connection table by inputting the diagnosis information from the diagnosis means of the transceiver.

In another aspect of the communication device of the present invention, when receiving a signal from any of the ports, the address correspondence table creating means acquires IP address of a source from an IP header of the signal, acquires MAC address corresponding to the port from the MAC table, stores the MAC address and the IP address of the source in the address correspondence table in association with each other.

In another aspect of the communication device of the present invention, the transmission/reception processing unit transmits a signal to keep alive to the adjacent station by broadcast or multicast, and when the signal to keep alive is received from the adjacent station, the transmission/reception processing unit acquires MAC address and IP address of a source from the signal to keep alive by using the address correspondence table creating means, and stores the MAC address and the IP address in the address correspondence table in association with each other.

Another aspect of the communication device of the present invention is used in a distribution system.

In another aspect of the communication device of the present invention, a distribution-system control device and/or a smart meter integrating device are/is connected.

A first aspect of a communication system of the present invention includes a communication device according to any one of the first to eighth aspects that is installed in a master station and a slave station of a node, respectively, and the ports are connected by the predetermined communication line.

In another aspect of the communication system of the present invention, the port management means of the communication device installed in the master station inputs the port connection table from the port management means of the communication device installed in the slave station, and manages connection state between the ports of the slave station by using the port connection table.

In another aspect of the communication system of the present invention, the communication system is used in a distribution system, and distribution-system communication device are installed in master stations and slave stations of the nodes performing monitoring control of a power distribution system.

Advantageous Effect of Invention

According to the present invention, it is possible to provide a communication device and a communication system in which multi-hop communication is possible and management of communication routes is easy.

BRIEF DESCRIPTION OF DRAWING

FIG. 9 is a table illustrating an example of an address correspondence table used in the distribution-system communication device according to the fourth embodiment of the present invention.

FIG. 10 is a table illustrating an example of a MAC table used in the distribution-system communication device according to the fourth embodiment of the present invention.

FIG. 11 is a table including port information created in the distribution-system communication device according to the fourth embodiment of the present invention.

DESCRIPTION OF EMBODIMENT

Figure 1:
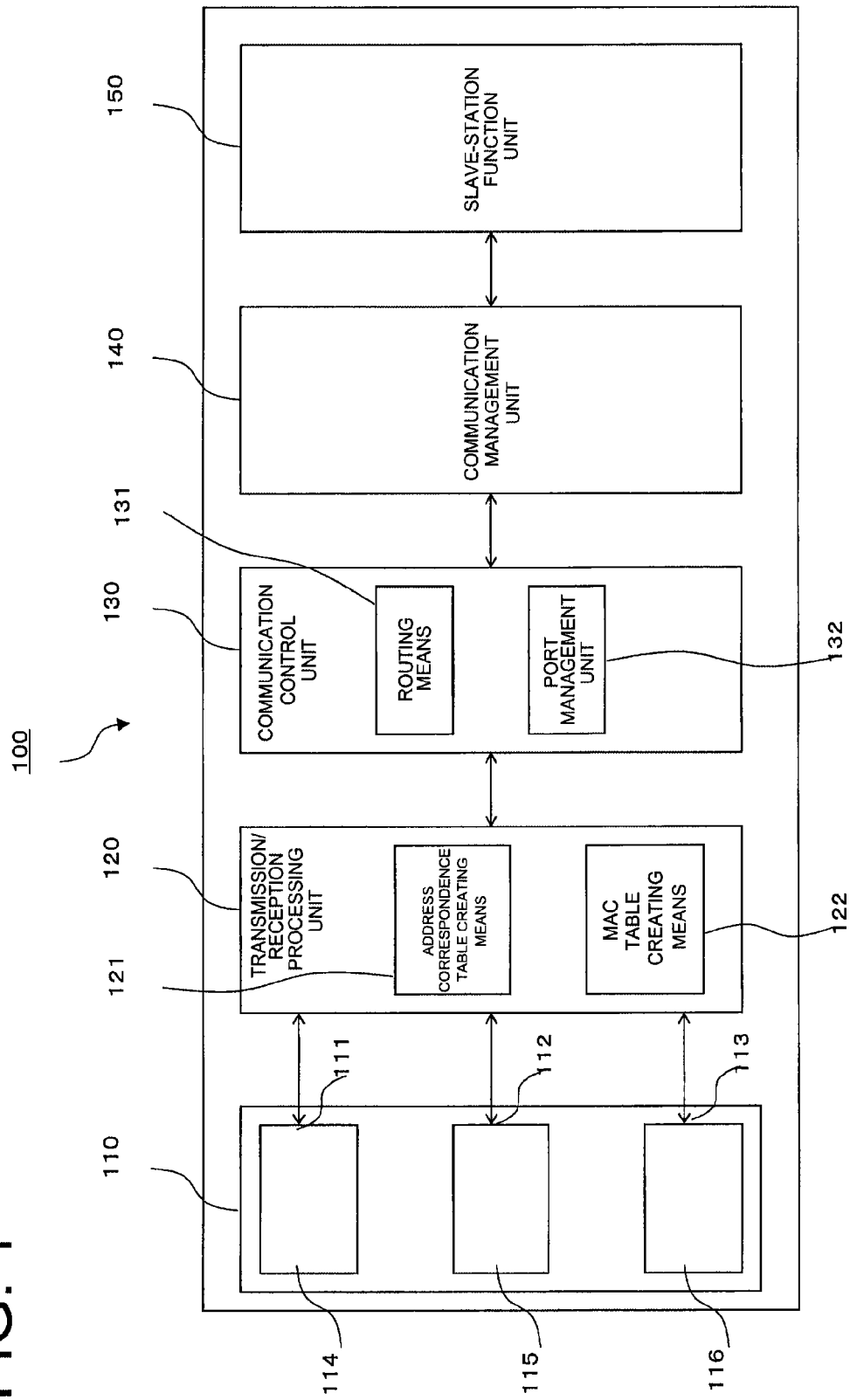
FIG. 1 is a block diagram illustrating a configuration of a distribution-system communication device according to a first embodiment of the present invention.

Communication devices and communication systems according to preferred embodiments of the present invention will be described below in detail with reference to the drawings. Also, for simplicity of illustration and description, components having the same function are denoted by assigning the same reference numerals. In the following, a case where the communication device and the communication system of the present invention are a distribution-system communication device and a distribution-system communication system and perform communication using optical signals will be described as an example, but the present invention is not limited thereto. The present invention can also be applied to a case where the communication device and the communication system of the present invention are other communication devices and communication systems or perform communication using electric signals via a metal cable.

Also, in the following, a case where the communication device and the communication system of the present embodiment are a distribution-system communication device and a distribution-system communication system, to which an AODV protocol used for a ZigBee (registered trademark) standard in a multi-hop communication technology is applied, will be described as an example. A routing function of the AODV protocol is processing of a network layer, and, when the distribution-system communication system of the present embodiment is configured by combining a communication using an optical cable and the routing function, the distribution-system communication device of the present embodiment, which is disposed at each node constituting the distribution-system communication system (network) of the present embodiment, needs to be constructed based on a protocol stack illustrated in FIG. 3. The protocol stack illustrated in FIG. 3 applies an optical Ethernet (registered trademark) standard to a physical layer and a MAC layer which are lower layers, and applies an AODV protocol used for the ZigBee (registered trademark) standard to a network layer which is an upper layer. By applying the protocol stack, it is possible to realize a multi-hop communication by an optical communication network.

First Embodiment

A distribution-system communication device according to a first embodiment of the present invention will be described with reference to a block diagram illustrated in FIG. 1. The distribution-system communication device 100 of the present embodiment is used as communication devices installed in a master station and slave stations of a power distribution system. The distribution-system communication device 100 includes a port section 110 having a port for connecting an optical fiber, a transmission/reception processing unit 120 connected to the port section 110, and a communication control unit 130 connected to the transmission/reception processing unit 120. Also, the distribution-system communication device 100 of the present embodiment may be configured to further include a communication management unit 140 connected to the communication control unit 130, and a slave-station function unit 150 connected to the communication management unit 140.

The port section 110 includes at least two ports, and FIG. 1 illustrates an example in which the port section 110 includes three ports 111, 112 and 113. Optical transceivers 114, 115 and 116, which perform a conversion from an optical signal to an electric signal or a conversion from an electric signal to an optical signal, are provided in the ports 111, 112 and 113, respectively. Optical fibers are connected to the optical transceivers 114, 115 and 116.

The transmission/reception processing unit 120 performs a MAC address management, which is processing of the MAC layer. When receiving a signal from any of the ports 111 to 113 of the port section 110, the transmission/reception processing unit 120 removes a MAC header from a frame of the reception signal and then outputs the reception signal to the communication control unit 130. Also, when receiving a transmission signal from the communication control unit 130, the transmission/reception processing unit 120 adds a MAC header to a frame of the transmission signal, selects a port to be connected to a destination among the ports 111 to 113, based on MAC address, and outputs the transmission signal to the selected port.

The communication control unit 130 performs a management of IP addresses of signal source and destination, which is processing of the network layer. The communication control unit 130 acquires IP addresses of the source and the destination from an IP header of a reception signal, or sets IP addresses of the source and the destination to an IP header of a transmission signal. Also, the communication control unit 130 includes a routing means 131 using an AODV protocol adopted in the ZigBee (registered trademark) standard.

The communication management unit 140 performs processing of the TCP/UDP layer. When receiving a frame from the communication control unit 130, the communication management unit 140 removes a TCP/UDP header and then outputs the data to the slave-station function unit 150 corresponding to the application (APP) layer. Also, when receiving data from the slave-station function unit 150, the communication management unit 140 adds a TCP/UDP header to the data and then outputs the data to the communication control unit 130.

The distribution-system communication device 100 illustrated in FIG. 1 is configured as including the communication management unit 140 of the TCP/UDP layer and the slave-station function unit 150 of the application layer. On the other hand, a communication device configured without the slave-station function unit 150 can be constructed by simply relaying communication between two adjacent stations. That is, the distribution-system communication device 100 of the present embodiment can be a distribution-system communication device functioning as a router relaying slave stations (hereinafter, referred to as a router communication device). Since the router communication device performs processing of simply transmitting data from an adjacent station of an input side to an adjacent station of an output side, the router communication device may be configured to include the port section 110 of the physical layer, the transmission/reception processing unit 120 of the MAC layer, and the communication control unit 130 of the network layer.

Figure 2:
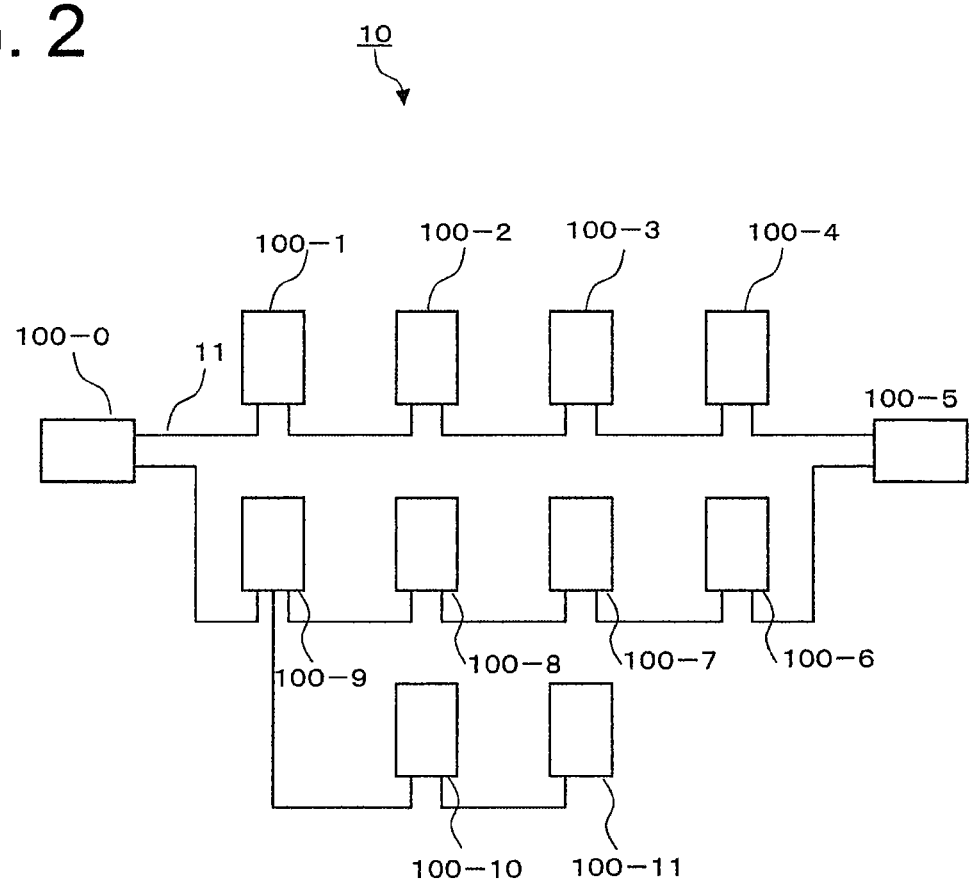
FIG. 2 is a block diagram illustrating a configuration of a distribution-system communication system according to the first embodiment of the present invention.

Next, a configuration of a distribution-system communication system according to a first embodiment will be described below with reference to FIG. 2. FIG. 2 is a block diagram illustrating the configuration of the distribution-system communication system according to the present embodiment. The distribution-system communication system 10 of the present embodiment is constructed by connecting the distribution-system communication device 100 disposed at the master station and the slave stations by optical fibers. In FIG. 2, the distribution-system communication device 100 installed in the master station is indicated by reference numeral 100-0, and the distribution-system communication devices 100 installed in the slave stations are indicated by reference numerals 100-1 to 100-11 (hereinafter, for simplicity, described as the master station 100-0 and the slave stations 100-1 to 100-11). The respective distribution-system communication devices 100 are connected to other adjacent distribution-system communication devices 100 by optical fibers 11.

Two slave stations 100-1 and 100-9 are connected to the master station 100-0, and the slave stations 100-1 to 100-9 are sequentially connected to form a loop. Also, the slave station 100-10 is further connected to the slave station 100-9, and the slave station 100-11 is connected to the slave station 100-10. Herein, although the slave station 100-11 is configured as being connected to only the slave station 100-10, the slave station 100-11 further includes other port that can be connected to other slave station (for example, the slave station 100-6). In the distribution-system communication system 10 illustrated in FIG. 2, the slave station 100-9 includes at least three ports, and the master station and the other slave stations include at least two ports.

When performing communication between the master station and the slave station or communication between the slave stations, the distribution-system communication device 100 and the distribution-system communication system 10 of the present embodiment use the multi-hop communication technology employing the AODV protocol applied to ZigBee (registered trademark), and transmit signals to the target master station or slave station (hereinafter, referred to as a target station) via other slave station or the master station (relay processing).

In the distribution-system communication device 100, the communication control unit 130 has a table (hereinafter, referred to as a communication route table) illustrated in FIG. 4 as information about an adjacent master station or slave station directly connected by the optical fiber 11 (hereinafter, referred to as an adjacent station). The communication route table illustrated in FIG. 4 is a table storing an adjacent station connected to a communication route from a corresponding station to a target station, and a communication cost when a signal is transmitted via the route.

Figures 3, 4:
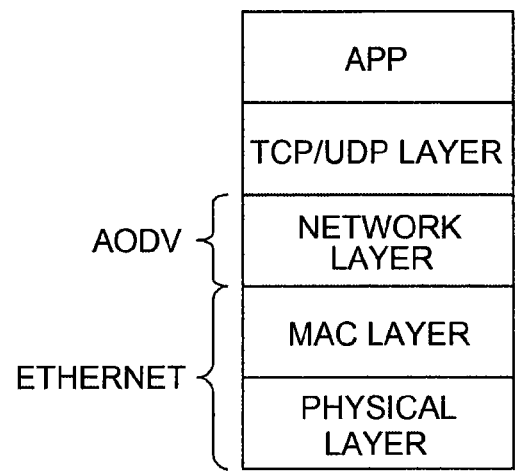
FIG. 3 is a protocol stack applied to the distribution-system communication device according to the first embodiment.
FIG. 4 is a diagram illustrating an example of a communication route table used in the distribution-system communication device according to the first embodiment.

In the multi-hop communication by the distribution-system communication device 100, a station of a source selects an adjacent station reaching a target station by using the communication route table illustrated in FIG. 4 and transmits a signal, and the adjacent station receiving the signal selects an adjacent station reaching a target station by using the communication route table illustrated in FIG. 4 and transmits a signal (relay processing). Then, a signal can be transmitted to the target station while the relay processing is performed until reaching the target station.

In the multi-hop communication, when the information (adjacent station, communication cost) of the communication route to the desired target station is not stored in the communication route table illustrated in FIG. 4, or when the signal has been transmitted to the adjacent station described in the communication route table but could not be normally transmitted, the communication control unit 130 performs a search for the communication route to the target station by using the routing means 131. The search for the communication route by the routing means 131 inquires of all slave stations about the communication route to the target station. When a notification indicating that the search for the communication route to the target station has succeeded is received from any of slave stations, the communication route having the lowest communication cost is selected among the notified communication routes and is stored in the communication route table.

In the inquiry about the communication route, when a route request packet is output from the station performing the inquiry to all adjacent stations, and the route request packet reaches a target station from an adjacent station via a predetermined route, a route reply packet is transmitted from the target station to the corresponding station via a route reverse to the searched route. Also, when a station other than the target station receives the route request packet, this is transmitted to the adjacent station as it is. When the station performing the inquiry receives the route reply packet from the target station, the corresponding station can acquire information of the communication route to the target station.

In the distribution-system communication device 100 and the distribution-system communication system 10 of the present embodiment, which perform the multi-hop communication as described above, information of the distribution-system communication device 100 of the adjacent station as well as the destination (target station) is included in the network layer. Therefore, in the communication control unit 130 of the network layer, the respective ports provided in the port section 110 can be managed using IP addresses of the adjacent stations. In the distribution-system communication device 100 of the present embodiment, the communication control unit 130 is configured to manage the respective ports by using the IP addresses of the adjacent stations, and a detailed content thereof will be described below.

In order to select one port among the plurality of ports of the port section 110 and transmit the signal, it is necessary to acquire MAC address for specifying the distribution-system communication device 100 of the destination in the communication control unit 130 and designate this to the transmission/reception processing unit 120. Since the communication control unit 130 has IP address of the destination, the communication control unit 130 needs to know MAC address from IP address.

On the other hand, the transmission/reception processing unit 120 of the MAC layer has an address correspondence table (address resolution protocol (ARP) table in IPv4, neighbor cache in IPv6) in which IP address and MAC address are stored in association with each other, and includes an address correspondence table creating means 121 that creates the address correspondence table. The address correspondence table is to convert IP address being logical address to MAC address being physical hardware address. Therefore, the communication control unit 130 can know MAC address from IP address by using the address correspondence table the transmission/reception processing unit 120 has.

In order to specify the distribution-system communication device 100 of the destination, the address correspondence table is used to designate the distribution-system communication device 100 of the destination, which has been designated by IP address, by MAC address, and stores correspondence information of the IP address and the MAC address. Also, the information stored in the address correspondence table is cleared when a predetermined time has elapsed. Therefore, with respect to the station that was first designated as the destination or the station that has not be designated as the destination for more than a predetermined time, the correspondence information of the IP address and the MAC address is not stored in the address correspondence table.

When the MAC address corresponding to the IP address of the station designated as the destination is not stored in the address correspondence table, a neighbor solicitation signal or an address request (ARP request) for inquiry about the MAC address of the destination is transmitted by broadcast (or multicast: all-router multicast or any cast is included, and the same applies hereafter). As a result, when there is a neighbor advertisement or a reply (ARP reply) to an address request signal from any of stations, the address correspondence table creating means 121 stores the MAC address in the address correspondence table in association with the IP address.

The communication control unit 130 of the distribution-system communication device 100 of the present embodiment can acquire IP addresses of adjacent stations of the reception side and the transmission side, in addition to the IP addresses of the source and the destination. Therefore, correspondence information of the IP address and the MAC address of the adjacent station can be known using the address correspondence table.

Separately from the address correspondence table, the transmission/reception processing unit 120 also has a MAC table that stores MAC addresses of adjacent stations connected to the respective ports of the port section 110 by the optical fibers 11, and includes a MAC table creating means 122 that creates the MAC table. The MAC table is a table that stores port numbers of the port section 110 and MAC addresses of adjacent stations connected thereto in association with each other. When the MAC address of the destination of the transmission signal is designated from the communication control unit 130, the transmission/reception processing unit 120 acquires the port number associated with the designated MAC address from the MAC table, and transmits the transmission signal from the port of the port number.

The information of the MAC table is created or updated when the transmission/reception processing unit 120 receives a signal. When receiving a signal from any one port of the port section 110, the transmission/reception processing unit 120 reads the MAC address of the source described in the MAC header of the reception signal, and stores it in the MAC table in association with the port number inputting the reception signal. Also, when the MAC address designated from the communication control unit 130 is not stored in the MAC table, the transmission/reception processing unit 120 transmits the transmission signal to all ports of the port section 110 other than the port receiving the transmission signal.

Each of the adjacent stations receiving the signal determines whether the MAC address of the destination described in the MAC header of the signal is matched with the MAC address of the corresponding station. As a result, when the MAC address of the destination is not matched with the MAC address of the corresponding station, the reception signal is discarded; however, when matched, a reply signal in which the MAC address of the corresponding station is described in the MAC header may be sent back to the source. In this case, the distribution-system communication device 100 of the source can acquire the MAC address of the source described in the MAC header of the reply signal, and store it in the MAC table in association with the port number receiving the reply signal. Therefore, new correspondence information of the port number and the MAC address can be added to the MAC table.

As described above, the communication control unit 130 of the network layer can acquire the IP addresses of the adjacent stations being the source and the destination of the signal, and can associate the IP address, the MAC address, and the port number with one another by using the address correspondence table and the MAC table the transmission/reception processing unit 120 has.

Then, in the distribution-system communication device 100 of the present embodiment, the port management means 132 is provided in the communication control unit 130 and the port management means 132 can manage the respective ports provided in the port section 110 by the IP addresses of the adjacent stations connected to the respective ports. Associating the respective ports of the port section 110 with the IP addresses of the connection destinations thereof will be hereinafter referred to as a port connection table.

The distribution-system communication devices 100 provided in the master station and the slave stations can manage the distribution-system communication devices 100 provided in other stations by the IP addresses. In particular, the distribution-system communication device 100-0 of the master station manages the respective slave stations inside the distribution-system communication system 10 by using the IP addresses. Therefore, in the port management means 132 included in the distribution-system communication device 100-0 of the master station, the port connection table can be input from the port management means 132 of each slave station, and the connection state between the ports of the slave stations can be managed based on the port connection table.

The distribution-system communication system 10 illustrated in FIG. 2 will be described as an example. The distribution-system communication device 100-0 of the master station can manage the connection relationship of the slave stations 100-1 to 100-11 inside the distribution-system communication system 10 by using the IP addresses and the port numbers of the port section 110. As an example, when the IP addresses of the slave stations 100-1 and 100-2 are A1 and A2 and the ports connecting the two slave stations 100-1 and 100-2 are the ports 113 and 111, respectively, the port management means 132 of the master station 100-0 can manage the connection relationship between the slave station 100-1 and the slave station 100-2 by the information indicating that the port 113 of the IP address A1 and the port 111 of the IP address A2 are connected to each other.

Since the distribution-system communication device 100 of the present embodiment is a communication device having the protocol of the network layer or higher, the connection information between the ports of the slave station can be managed using the IP addresses by providing the port management means 132 in the communication control unit 130 of the network layer. That is, in the master station, the connection relationship between the slave stations can be managed by port levels. In contrast, in the L2 switching hub having the protocol of the MAC layer or lower, even when the IP address of the node connected to the network is known, the connection relationship between the ports and the nodes cannot be known.

Second Embodiment

Figure 5:
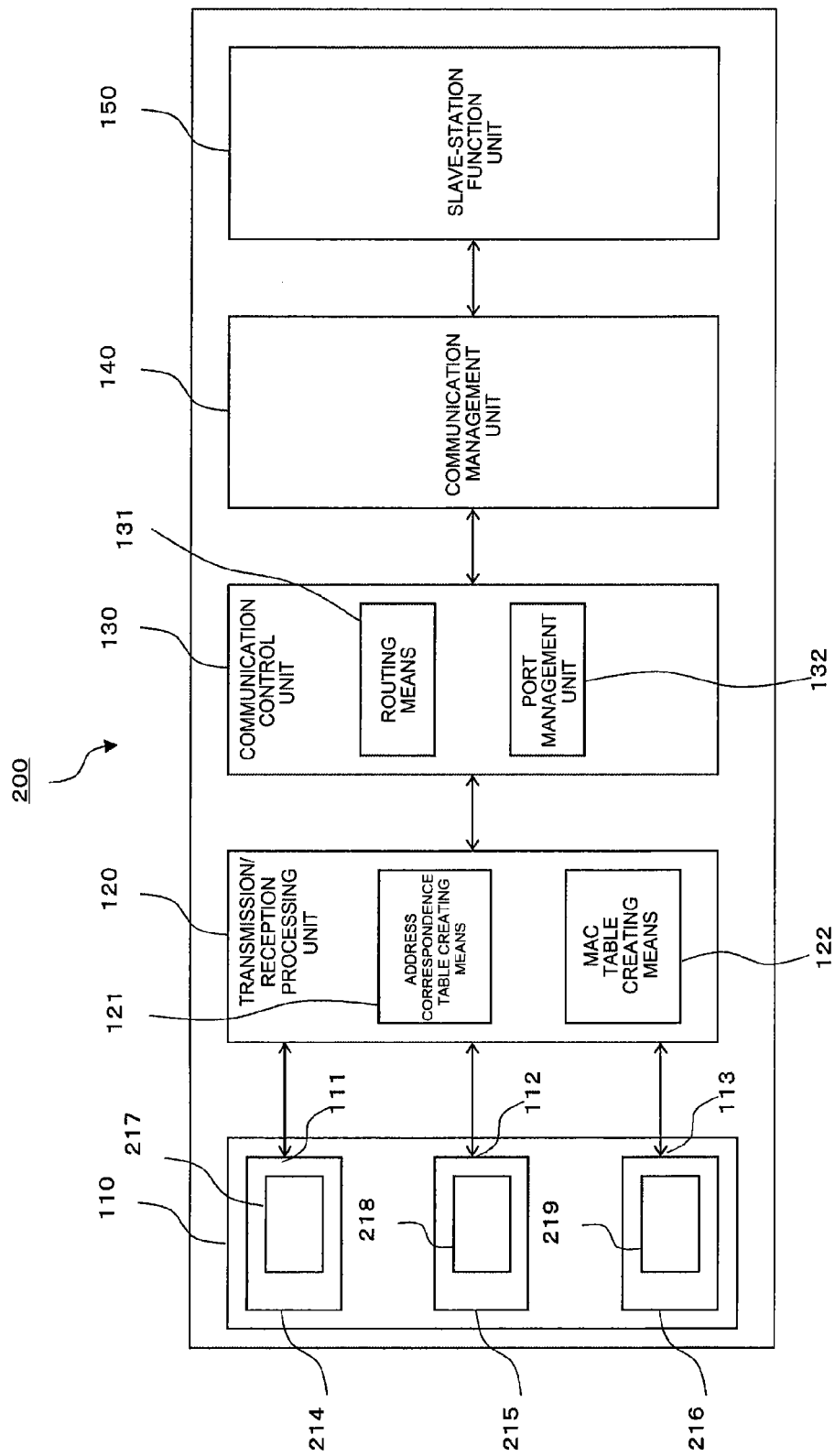
FIG. 5 is a block diagram illustrating a configuration of a distribution-system communication device according to a second embodiment of the present invention.

A distribution-system communication device according to a second embodiment of the present invention will be described with reference to a block diagram illustrated in FIG. 5. In the distribution-system communication device 200 of the present embodiment, transceivers 214 to 216 provided at ports of a port section 110 are configured to include digital diagnostic monitor (DDM) means 217 to 219. The port management means 132 of each slave station can acquire diagnosis information of each transceiver from the DDM means 217 to 219 of the transceivers 214 to 216 provided at the respective ports of the port section 110 and manage the diagnosis information together with a port connection table.

Also, the port management means 132 of the master station can perform a management by inputting diagnosis information together with the port connection table from the port management means 132 of each slave station. By acquiring the diagnosis information (of the transceiver) of each port, for example, a case where an output of an optical signal is lowered in a communication route connecting predetermined slave stations can be detected in an early stage and a warning can be given to a system operator. Also, when necessary, a search for other communication route can be performed. Therefore, the reliability of the distribution-system communication system of the present embodiment can be increased.

Third Embodiment

Figure 6:
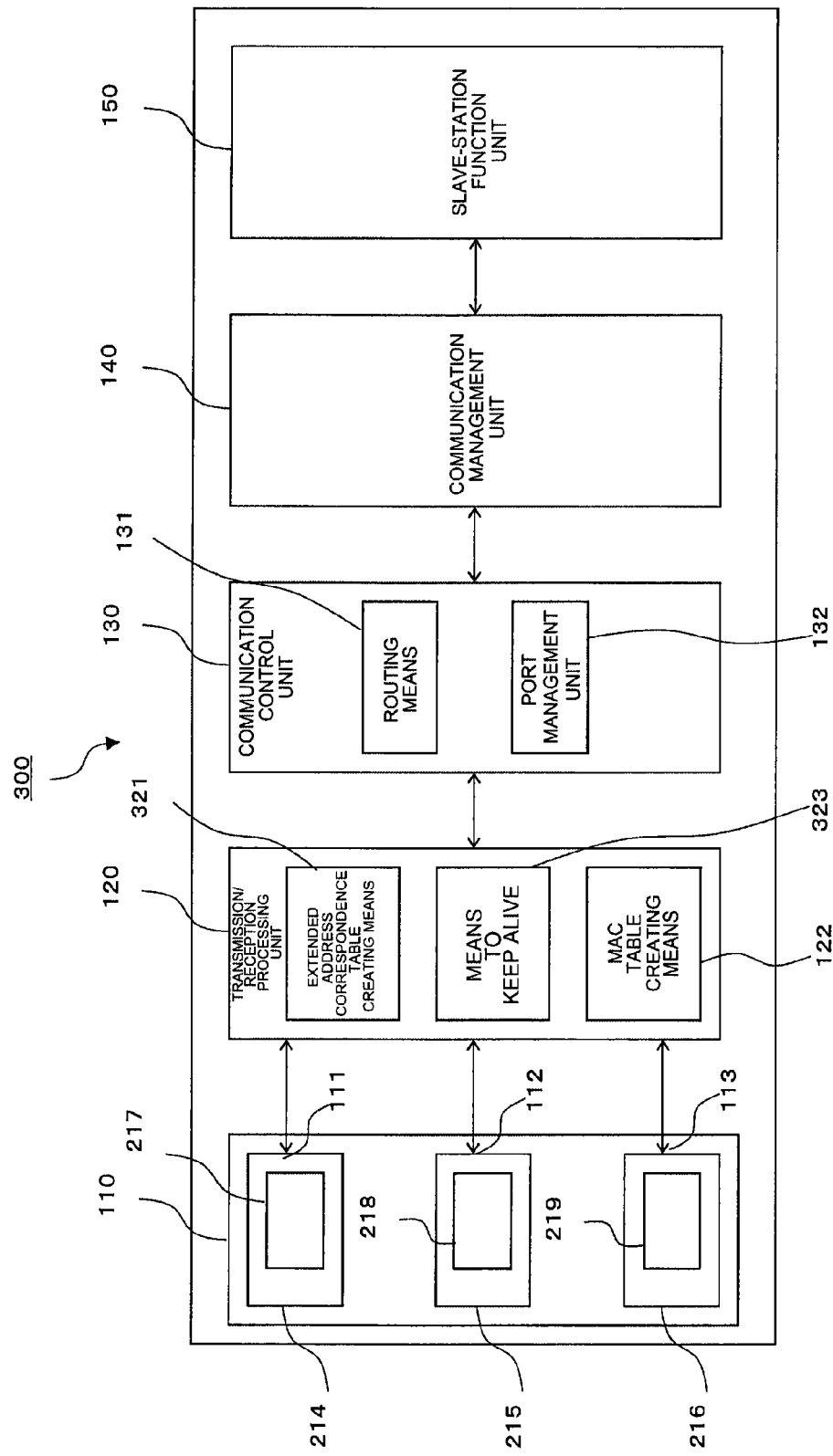
FIG. 6 is a block diagram illustrating a configuration of a distribution-system communication device according to a third embodiment of the present invention.

A distribution-system communication device according to a third embodiment of the present invention will be described below with reference to a block diagram illustrated in FIG. 6. In the past, only the correspondence information of the IP address and the MAC address of the node of the destination is stored in the address correspondence table. Therefore, when the communication is not performed between two stations connected by the optical fiber, the connection relationship regarding the port of each station used for connection therebetween cannot be managed by the IP address. The master station may need to determine whether a communication route, which has not been used until then, is available as, for example, an alternative route of a disabled communication route. Therefore, it is preferable that information of all communication routes within the distribution-system communication system can be managed.

In the distribution-system communication device 300 of the present embodiment, an extended address correspondence table creating means 321 is provided in the transmission/reception processing unit 120, instead of the address correspondence table creating means 121. When receiving a signal from the adjacent station as well as when transmitting a signal, the extended address correspondence table creating means 321 adds the correspondence information of the MAC address and the IP address of the adjacent station of the source to the address correspondence table.

Also, in the MAC layer, whether each communication route is available is confirmed by transmitting and receiving a signal to keep alive periodically in the past. The transmission and reception of the signal to keep alive are performed to all adjacent stations by the broadcast or multicast. When the signal to keep alive is received from the adjacent station, it is determined that the communication route and the slave station of the source are normal (survived) between them. In the past, in the case of transmitting the signal by the broadcast or multicast, the correspondence relationship between the IP address and the MAC address of the destination has not been stored in the address correspondence table.

Then, in the distribution-system communication device 300 of the present embodiment, a means to keep alive 323 is provided in the transmission/reception processing unit 120 of the MAC layer and periodically transmits the signal to keep alive to the adjacent station by the broadcast or multicast. When receiving the signal to keep alive, the extended address correspondence table creating means 321 adds the correspondence relationship between the MAC address and the IP address of the adjacent station of the source to the address correspondence table. Therefore, correspondence information of IP addresses and MAC addresses of all adjacent stations, whose communication routes are normal, can be acquired and stored in the address correspondence table. Also, it is possible to periodically update the address correspondence table by periodically performing the broadcast (or multicast) transmission of the signal to keep alive.

Fourth Embodiment

In the present embodiment, at the time of signal reception as well as signal transmission, the address correspondence table is created from IP address and MAC address of a received packet. This can be realized by processing of recognizing information of MAC address and IP address of a source described in a transmitted packet and recording it in an address correspondence table.

As the specific reception signal, the most suitable signal is a signal to keep alive (or hello signal) that is a 1 hop broadcast (or all-router multicast) signal periodically transmitted by each node (distribution-system communication device). Since this signal uses the broadcast (or multicast), it is transmitted without knowing a combination of IP address and MAC address of the other party, and the address correspondence table is not created. However, since a combination of the IP address and the MAC address of the source is described in a packet, it can be recognized in a receiver. Using this, the receiver of each signal to keep alive employs a configuration of recognizing the IP address and the MAC address of the source and additionally describing it in the address correspondence table. Since the signal to keep alive is also generated in a route that is not used in a communication of an upper layer, information of the corresponding route can also be described in the address correspondence table. Since this signal is periodically output from each of all nodes, it is possible to cover address correspondence information of all nodes by acquiring that information.

Also, the same processing is possible even in the case of using a routing signal packet (route request packet) employed in the routing means or other broadcast (or multicast)/unicast packet.

Figure 7:
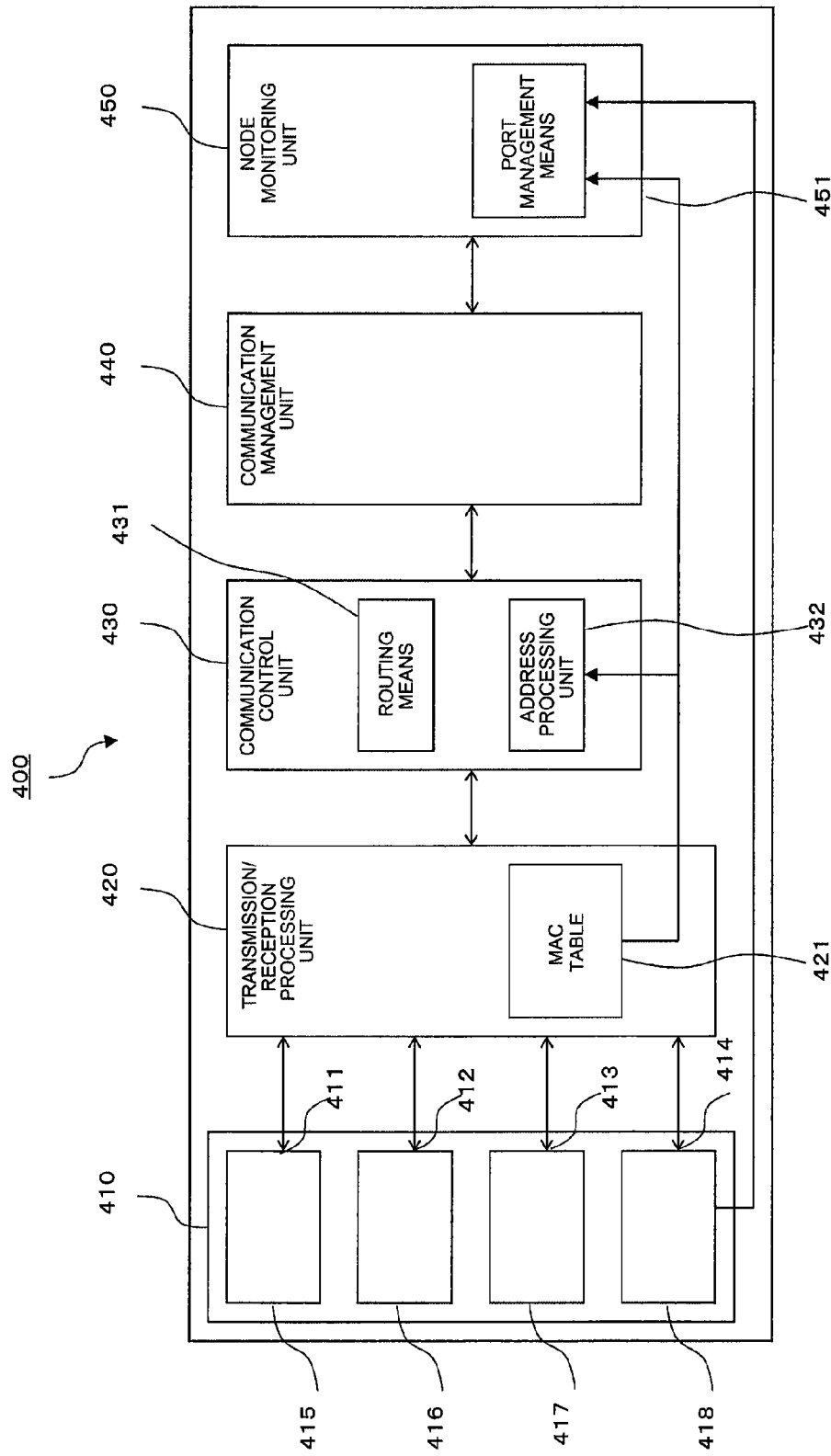
FIG. 7 is a block diagram illustrating a configuration of a distribution-system communication device according to a fourth embodiment of the present invention.

Hereinafter, a distribution-system communication device according to a fourth embodiment of the present invention will be described with reference to FIG. 7. FIG. 7 is a block diagram illustrating a configuration of a distribution-system communication device according to a fourth embodiment. The distribution-system communication device (node) 400 of the present embodiment is connected to a network requiring high reliability, such as distribution automation, and includes a physical layer processing unit 410, a transmission/reception processing unit 420, a communication control unit 430, a communication management unit 440, and a node monitoring unit 450 as an internal configuration of the distribution-system communication device 400.

The physical layer processing unit 410 handles physical layer information and includes transceivers 415 to 418. The number of the transceivers and a communication medium can be selected arbitrarily (optical, metal, or the like). The transmission/reception processing unit 420 performs processing of a data link layer and has a MAC table 421 for designating output transceivers. An output port with respect to each MAC address is shown in the MAC table 421.

The communication control unit 430 performs processing a network layer and includes a routing means 431. Also, the communication control unit 430 includes an address processing unit (address correspondence table creating means) 432 that acquires MAC address corresponding to IP address to be transmitted by address corresponding processing (ARP request signal and ARP reply signal in IPv4, neighbor solicitation and neighbor advertisement in IPv6) and describes it in the address correspondence table 421.

Also, the communication management unit 440 manages processing of L4 to L6, and the node monitoring unit 450 manages processing of L7. The node monitoring unit 450 monitors at least a route or a node state, and may have a control monitoring function of a distribution system or an integration function of a smart meter. The node monitoring unit 450 includes a port management means 451. The port management means 451 collects information from the address processing unit 432 and the MAC table 421, and manages the ports and the IP addresses together. Also, the port management means 451 can record a combination of the MAC address and the IP address, which are acquired from the received packet, in the address correspondence table. The port management means 451 may further include a means for acquiring state information of the transceiver and may manage the state information of the transceiver along with a port-to-IP table (port connection table).

Figure 8:
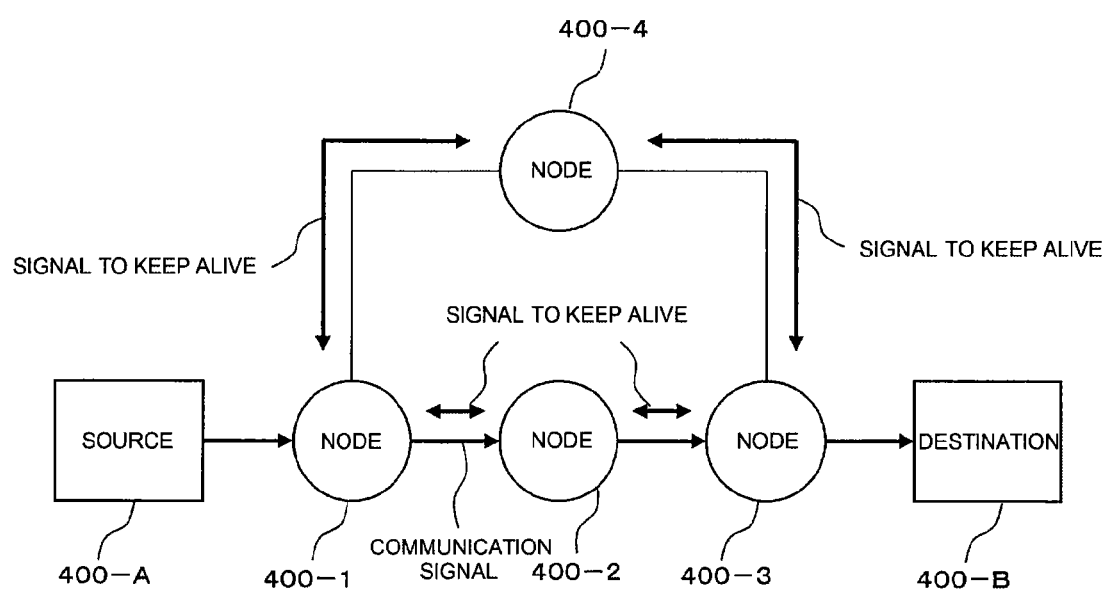
FIG. 8 is a block diagram illustrating a configuration example of a distribution-system communication system according to the fourth embodiment of the present invention.

Hereinafter, the operation of the distribution-system communication device 400 of the present embodiment will be described using the network illustrating an example of the distribution-system communication system of the present embodiment illustrated in FIG. 8. In FIG. 8, a source 400-A, a destination 400-B, and nodes 400-1 to 400-4 are configured using the distribution-system communication device 400 of the present embodiment. It is assumed that communication is performed from the source 400-A to the destination 400-B, and typically, via the nodes 400-1, 400-2 and 400-3.

Typically, address processing is performed among only the nodes 400-1, 400-2 and 400-3 and is not performed between the unused node 400-4 and nodes 400-1 and 400-3. Therefore, the management combined with the ports and the IP addresses cannot be performed between the nodes 400-1 and 400-4 and the like. As a result, when an error occurs in a section of the nodes 400-1 to 400-3, it is impossible to confirm a state of a route to be switched including the node 400-4.

Therefore, in the distribution-system communication device 400 of the present embodiment, information of the node 400-4 is also described by the address processing unit 432 in the address correspondence table by using the fact that some reception signals reach the node 400-4. Specifically, as some reception signals, there is a hello packet (signal to keep alive) or a route search packet used in the routing protocol, and this signal is propagated by the broadcast or multicast even when having no accurate address.

When the signal such as the hello packet is output from the node 400-4, information of the node 400-4 is written to the nodes 400-1 and 400-3. Thus, the address correspondence table can be updated, and the management of the ports and the IP addresses can be realized. The packet described above is not limited to the hello packet or the signal to keep alive, and any packet is possible. However, packets to keep alive periodically output from all nodes are most suitable.

An example of the address correspondence table is illustrated in FIG. 9. IP address requested for communication is searched from the IP field of the address correspondence table illustrated in FIG. 9, and corresponding MAC address is found from the MAC field of the address correspondence table corresponding to the searched IP address. Also, when the IP address requested for communication is not present in the IP field of the address correspondence table, the corresponding node 400 acquires the MAC address by transmitting the address request signal (ARP request signal or neighbor solicitation) as the MAC address inquiry signal. Also, the acquired MAC address is added to the address correspondence table.

An example of the MAC table 421 is illustrated in FIG. 10. The MAC table 421 is set when one transmission node has a plurality of transmission/reception ports, and a port to be transmitted is described for each MAC address being the destination. When receiving a request for signal transmission to MAC address that is not described in the MAC table, it corresponds to transmission to all ports, and when receiving a signal from non-described MAC address, the corresponding MAC address and the received port are described in pair in the MAC table 421.

From the address correspondence table and the MAC table 421, the node monitoring unit 450 generates information of IP address and port matched with the two tables. Therefore, it is possible to manage the information of the port and the IP address together. Also, for example, as illustrated in FIG. 11, a transmission (Tx) signal strength or a reception (Rx) signal strength of the transceiver of each port can be managed together. As a result, it is possible to confirm a route where a reduction in the Tx signal strength appears (route No. 2 illustrated in FIG. 11), and a control to avoid the use of the corresponding route is possible.

In the distribution-system communication device of the present embodiment, the redundant route, which is not used in the communication of the upper layer, can also be described in the address correspondence table, and a combination of the port and the IP address can be taken. That is, the transceiver information and the port can be managed together. Therefore, since it is possible to determine which route becomes a problem when degradation is found in the transceiver, a communication network having higher reliability is realized.

Also, as an additional effect, since the address correspondence table has already been registered, new address processing is unnecessary at the time of switching, and thus, communication can be initiated faster.

Fifth Embodiment

Figure 12:
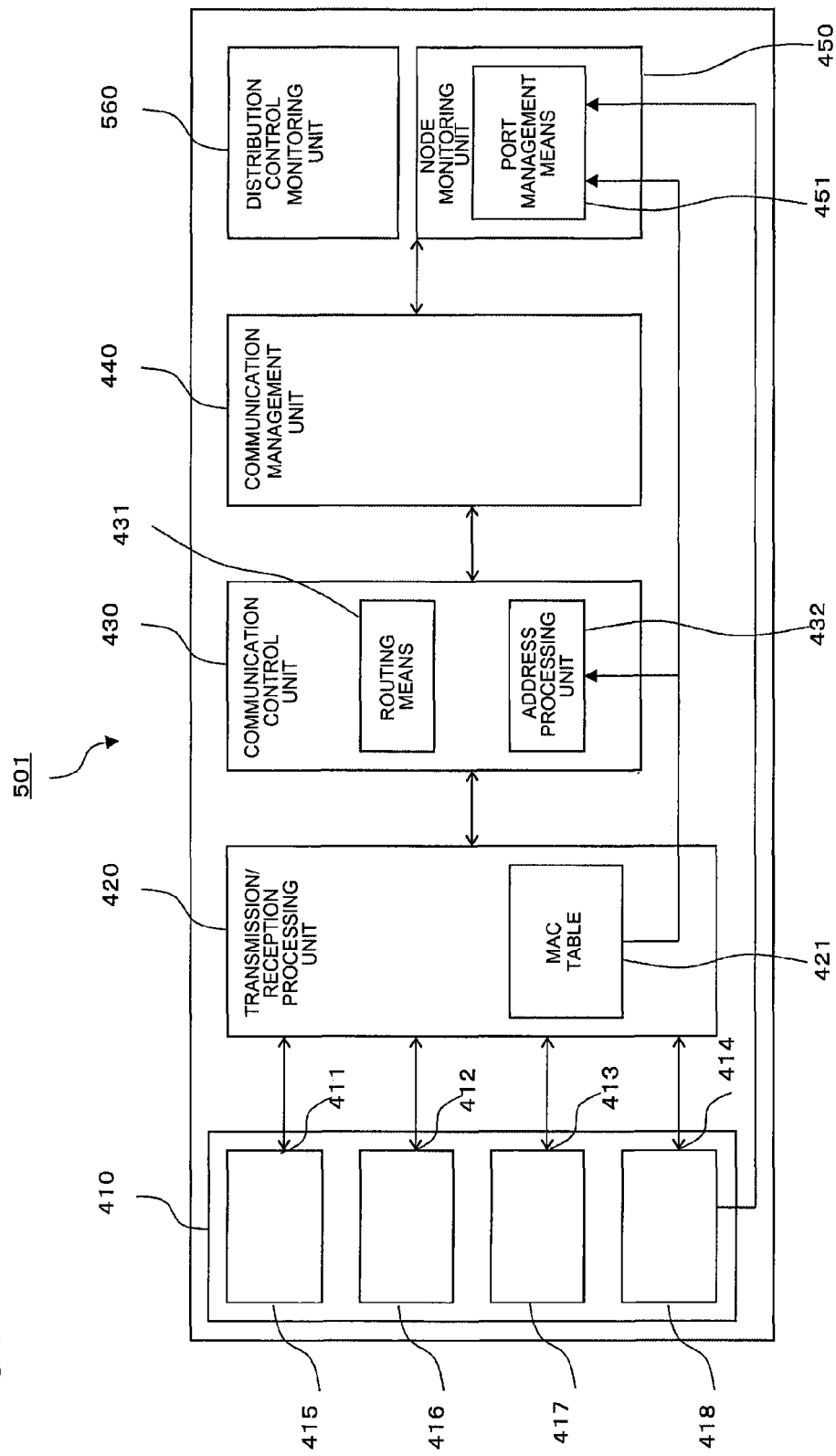
FIG. 12 is a block diagram illustrating a configuration example of a distribution-system communication device according to a fifth embodiment of the present invention.

The distribution-system communication device and the distribution-system communication system of the present invention can be used in monitoring control of a distribution system, a relay of a smart meter, and the like. FIG. 12 illustrates an example of the distribution-system communication device according to the fifth embodiment of the present invention, which includes a distribution control monitoring unit used in monitoring control of a distribution system. In the distribution-system communication device 501 illustrated in FIG. 12, a distribution control monitoring unit 560 is integrally disposed in parallel with a node monitoring unit 450. Distribution control information is taken out in a communication management unit 440 and is input to the distribution control monitoring unit 560, so that it can be used for a trigger performing distribution control. Also, the result obtained when the distribution control monitoring unit 560 has performed the distribution monitoring control can be transmitted to other nodes via the communication management unit 440 and the communication control unit 430.

Figure 13:
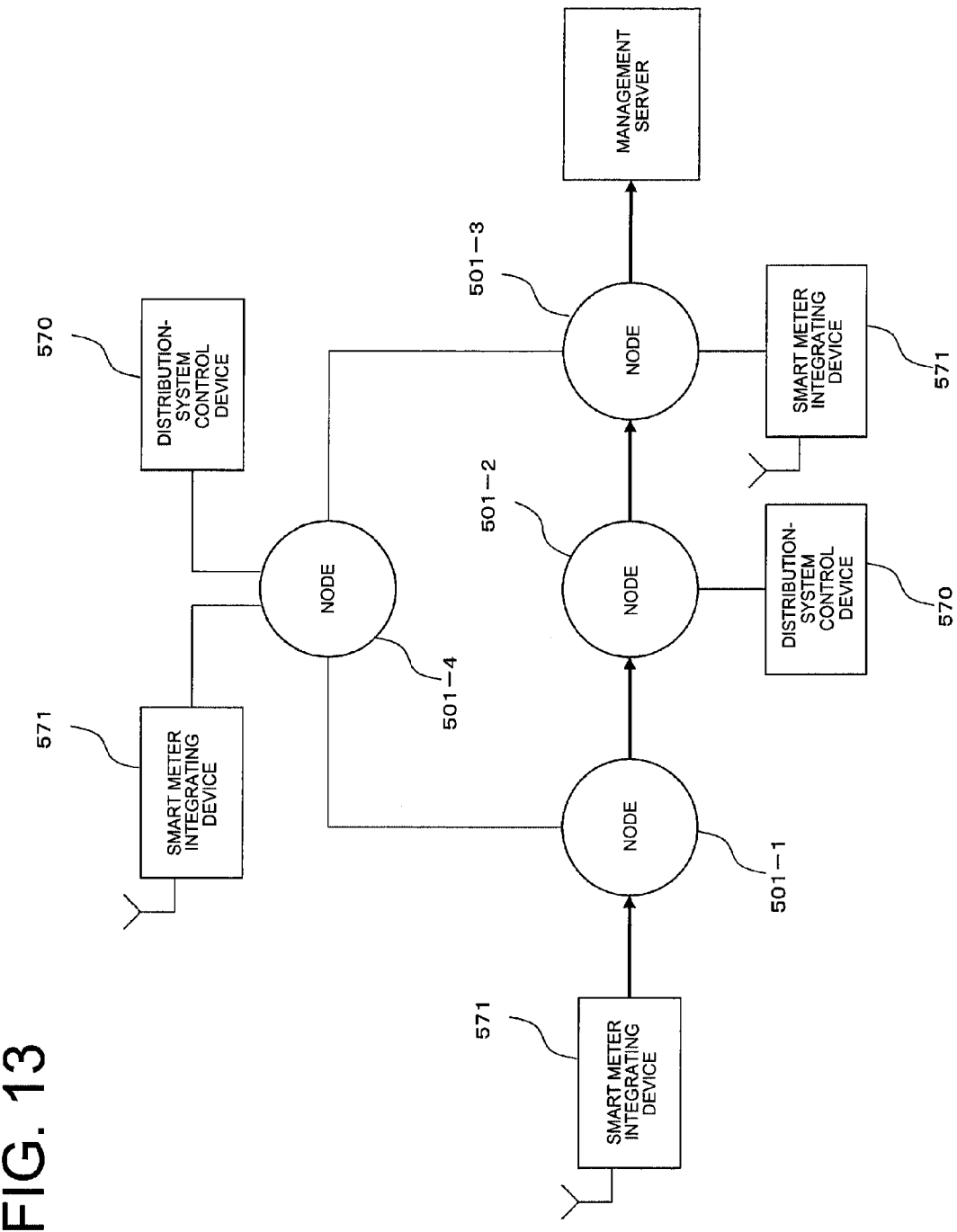
FIG. 13 is a block diagram illustrating an example of a distribution-system communication system in which a distribution-system control device and a smart meter integrating device are connected to the distribution-system communication device according to the fifth embodiment of the present invention.

In the distribution-system communication device of the present embodiment, a distribution control device or a smart meter integrating device can be connected to one of ports of a physical layer processing unit 410. As an example, as illustrated in FIG. 13, only a distribution-system control device 570 may be connected to a node, or only a smart meter integrating device 571 may be connected to a node, or both may be connected to a node. Also, there may be nodes for information transmission lines that are not connected together.

The smart meter integrating device 571 or the distribution-system control device 570 may be connected to arbitrary ports, and transmission to other node or management server is performed by the communication control unit 430. By employing the distribution-system communication device of the present embodiment in a middle node, it is easy to grasp the situation of the route and it is possible to realize high reliability required by the smart meter integrating device 571 or the distribution-system control device 570.

Figure 14:
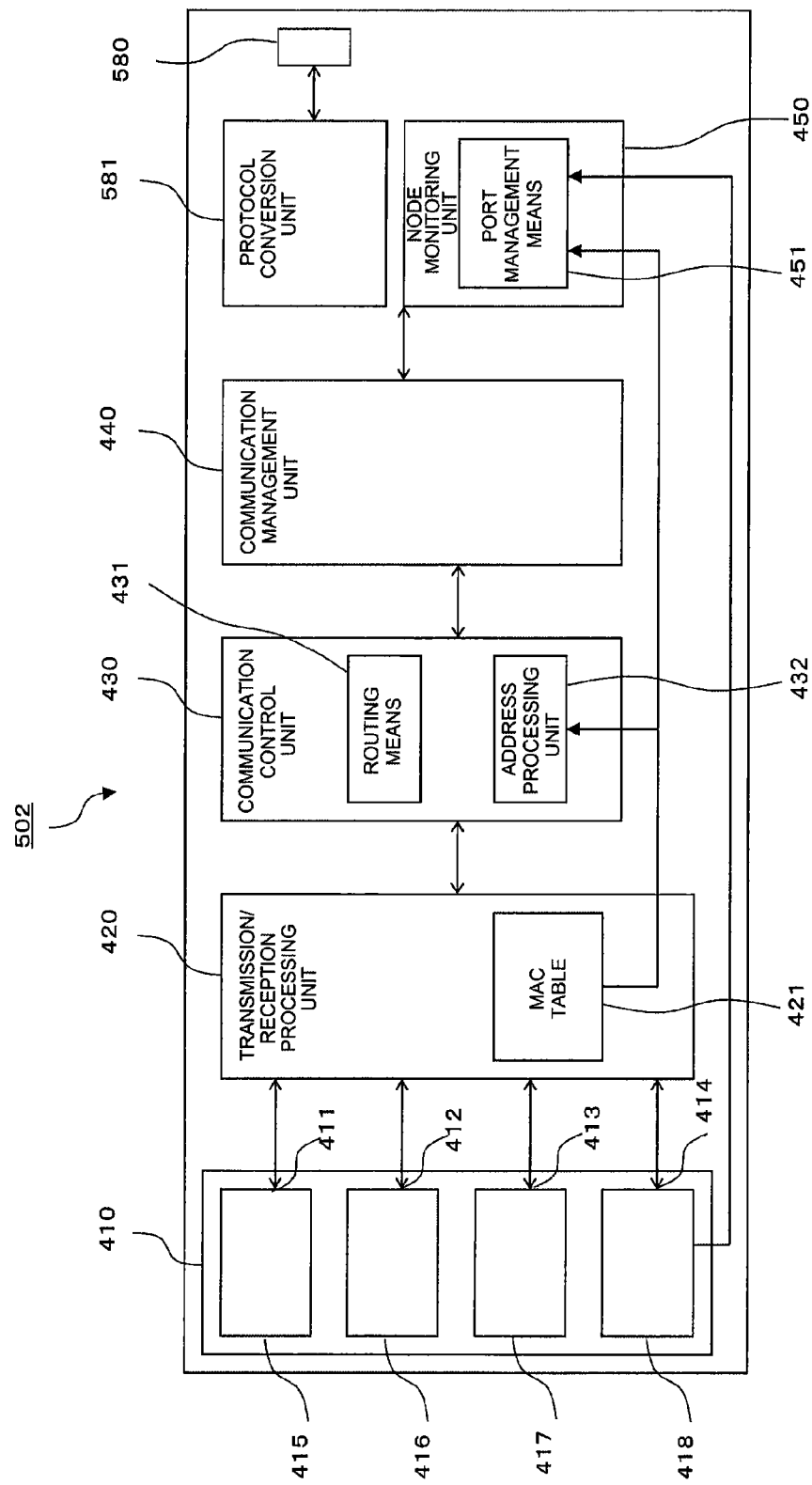
FIG. 14 is a block diagram illustrating another configuration example of the distribution-system communication device according to the fifth embodiment of the present invention.
Figure 15:
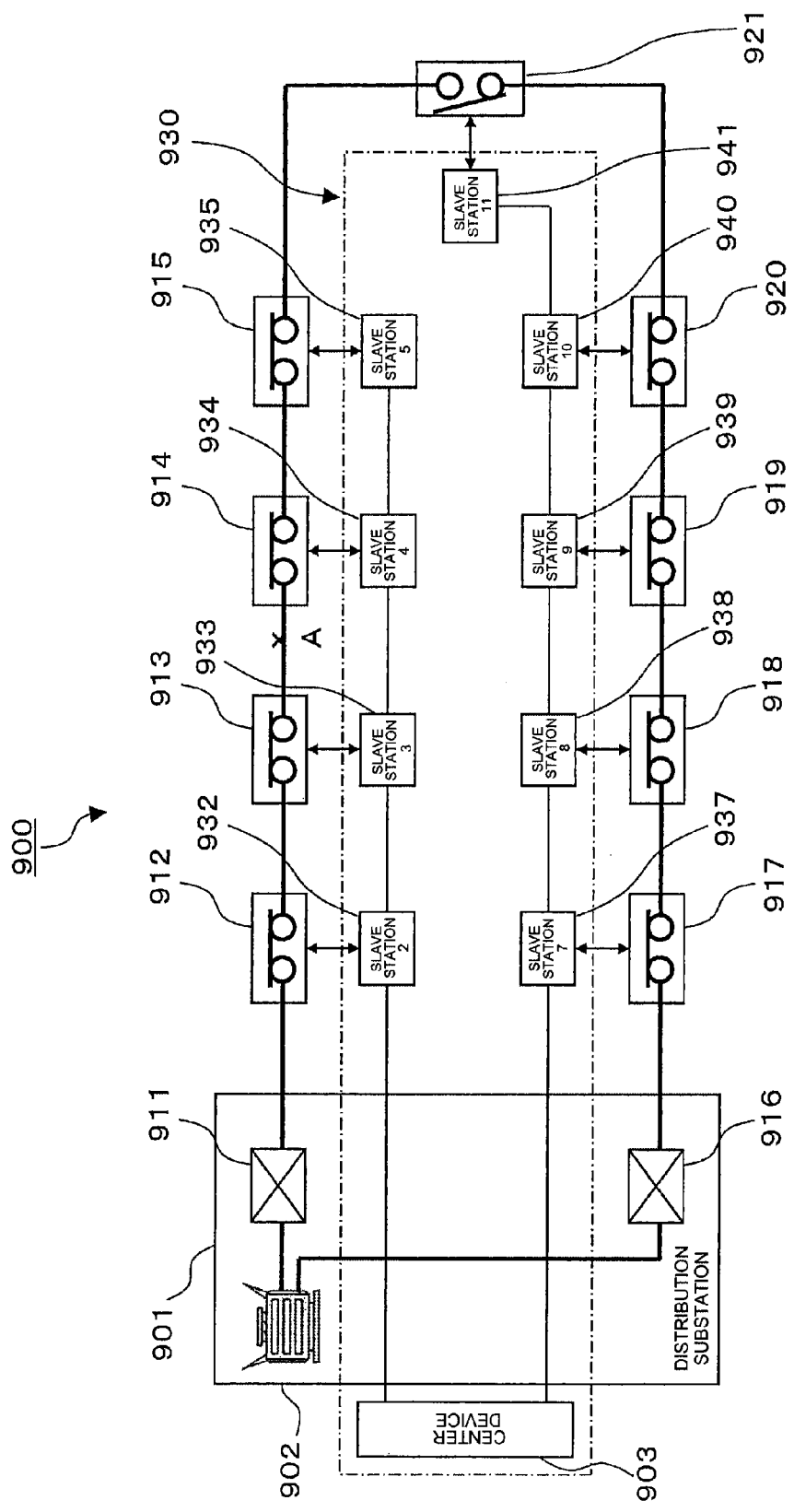
FIG. 15 is a block diagram illustrating a configuration of a power distribution system using a conventional monitoring control system.

Also, the distribution-system control device/the smart meter integrating device other than the IP protocol can be connected to the distribution-system communication system of the present embodiment. FIG. 14 illustrates an example of the distribution-system communication device of the present embodiment to which the communication device other than the IP protocol can be connected. The distribution-system communication device 502 of the present embodiment includes a communication device 580 of another protocol, and a protocol conversion unit 581. A signal passing through the communication device 580 is converted to a signal of IP protocol in the protocol conversion unit 581 and is then output to another node or the like.

Although the case of the communication by the optical signal using the optical cable has been described above, the present invention is not limited thereto and can also be applied to the communication by the electric signal using the metal cable. The description in the present embodiment illustrates an example of the distribution-system communication device and the distribution-system communication system according to the present invention, but is not limited thereto. The detailed configuration and detailed operation of the distribution-system communication device and the distribution-system communication system of the present embodiment can be appropriately modified without departing from the scope of the present invention.

REFERENCE SIGNS LIST

10 distribution-system communication system
11 optical fiber
100, 200, 300, 400, 501, 502 distribution-system communication device
110 port section 111-113, 411-414 port
114-116, 214-216 optical transceiver
120, 420 transmission/reception processing unit
130, 430 communication control unit
131, 431 routing means
140, 440 communication management unit
150 slave-station function unit
217-219 digital diagnostic monitor means
321 extended address correspondence table creating means
323 means to keep alive
410 physical layer processing unit
415-418 transceiver
421 MAC table
432 address processing unit
450 node monitoring unit
451 port management means
560 distribution control monitoring unit
570 distribution-system control device
571 smart meter integrating device
580 communication device
581 protocol conversion unit

The invention claimed is:

1. A communication device, which is disposed at each of two or more nodes constituting a multi-hop communication network in which the two or more nodes transmit signals through a predetermined communication line directly or indirectly via others of the two or more nodes, each of the two or more nodes comprising two or more ports that are directly connected to adjacent ones of the nodes by the predetermined communication line, the communication device comprising:
circuitry connected to the two or more ports and configured to
communicate, using an adjacent node connected to each of the two or more ports, with others of said two or more nodes in the multi-hop communication network via multi-hop communication in which the two or more nodes transmit signals through the predetermined communication line directly or indirectly via said others of the two or more nodes;
manage Media Access Control (MAC) addresses of a signal source and a signal destination;
manage Internet Protocol (IP) addresses of the signal source and the signal destination;
create an address correspondence table by associating the IP address and the MAC address of the signal destination;
create a MAC address table storing the MAC address of the adjacent node connected to said each of the two or more ports, the MAC address table being distinct from the address correspondence table; and
when a signal to keep alive transmitted by broadcast or multicast at a given cycle from the adjacent node as the signal source is received, acquire the MAC address and IP address of the adjacent node from the signal to keep alive and add a combination of the MAC address and the IP address acquired from the signal to keep alive to the address correspondence table or update the address correspondence table at said cycle.

2. The communication device according to claim 1, wherein the circuitry is further configured to
determine a communication route, and
associate the port and the IP address of a connection destination with each other from the MAC address table and the address correspondence table, create a port management table associating state information of a communication route connected to the port, and perform port management and routing processing based on information of the port management table.

3. The communication device according to claim 1, wherein the circuitry is further configured to
create a port connection table associating the port and the IP address of the connection destination by inputting the MAC address table and the address correspondence table, and manage the connection destination of each of the ports by the IP address by using the port connection table.

4. The communication device according to claim 3, wherein a transceiver is provided in the port,
the transceiver comprises a diagnosis circuit configured to diagnose an operation state, and
the circuitry is configured to manage diagnosis information together with the port connection table by inputting the diagnosis information from the diagnosis circuit of the transceiver.

5. The communication device according to claim 3, wherein when receiving a signal from any of the ports, the circuitry is configured to acquire an IP address of a source from an IP header of the signal, acquire a MAC address corresponding to the port from the MAC address table, and store the MAC address and the IP address of the source in the address correspondence table in association with each other.

6. The communication device according to claim 1, wherein the communication device is used in a power distribution system.

7. The communication device according to claim 6, wherein a distribution-system control device and/or a smart meter integrating device are/is connected to the communication device.

8. A communication system comprising a communication device according to claim 1 that is installed in a master station and a slave station, respectively,
wherein the predetermined communication line is connected between the ports of the master station and the ports of the slave station.

9. The communication system according to claim 8, wherein the circuitry of the communication device installed in the master station is configured to input the port connection table from the circuitry of the communication device installed in the slave station, and to manage a connection state between the ports of the slave station by using the port connection table.

10. The communication system according to claim 8, wherein the communication system is used in a power distribution system, and distribution-system communication devices are installed in master stations and slave stations performing monitoring control of the power distribution system.

* * * * *